Patented Feb. 25, 1947

2,416,650

UNITED STATES PATENT OFFICE 2,416,650

PROCESS FOR THE PREPARATION OF β-NITROETHYL ETHERS

Arthur Ernest Wilder Smith, Robert Holroyd Stanley, and Charles William Scaife, Norton-on-Tees, England, assignors to Imperial Chemical Industries Limited, a corporation of Great Britain No Drawing. Application June 29, 1943, Serial No. 492,780. In Great Britain February 2, 1942

6 Claims. (Cl. 260—614)

This invention relates to the preparation of β-nitroethyl ethers which apart from β-nitroethyl ethyl ether are believed to be novel.

According to this invention β-nitroethyl ethers are prepared by reacting nitroethylene with an alcohol. The reaction proceeds slowly at room temperature, but higher temperatures are preferred, e. g., in the region of the boiling point of the alcohol employed.

The pressure does not appear to be critical but increased pressure is advantageous.

The nitroethylene may be conveniently prepared in situ as described in U. S. Patent No. 2,385,111 but instead of being polymerized, maintained in contact with an excess of the alcohol to convert it into the β-nitroethyl ether.

Example 1

The apparatus consisted of a 2-necked 750 ccs. flask, one neck of which was fitted with a dropping funnel and in the other was inserted the lower end of a fractionating column at the top of which was a reflux head with a variable take-off. 400 grams ethyl alcohol were refluxed in the flask and 200 g. molten dinitroethane were run in from the dropping funnel at a constant rate over a period of 5 hours; the temperature of the heating bath was adjusted so that ethyl nitrite refluxed at the top of the column and was taken off rapidly, thus removing one of the reaction products as soon as formed and thereby assisting the reaction. After all the dinitroethane had been added, the reaction mixture was refluxed for 10 hours and any further ethyl nitrite formed was removed at the top of the column.

Excess alcohol was then distilled off under water pump vacuum and the residue subjected to a rough distillation. The yield of β-nitroethyl ethyl ether by this method averaged about 50%.

Example 2

30 grams of β-nitroethyl nitrate were refluxed with 150 ccs. of ethyl alcohol for 8 hours. The alcohol was then removed in vacuo and the residue distilled, giving 14.95 grams of β-nitroethyl ethyl ether, having a boiling point of 48° C., under 1.5 mm. of mercury.

Example 3

75 grams of benzyl alcohol were heated to 110° C., and 20 grams of dinitroethane dissolved in 25 ccs. benzyl alcohol were added very slowly. After 10 minutes a vigorous reaction started and an odour of nitroethylene and benzaldehyde was noticed, indicating that some benzyl alcohol was being oxidised. The reaction mixture was heated for 2 hours at 120° C., and the excess benzyl alcohol was then removed under reduced pressure. A heavy red oil remained containing β-nitroethyl benzyl ether.

Example 4

220 grams of n-propyl alcohol were reacted with 100 grams of molten dinitroethane in the apparatus described in Example 1. Dinitroethane was added at a constant rate over a period of 6 hours. N-propyl nitrite was removed from the reaction mixture as it was formed. After all the dinitroethane had been added, the mixture was refluxed for a further 4 hours and the excess propyl alcohol was finally removed under reduced pressure. The residue was distilled under high vacuum yielding 58.4 grams of n-propyl β-nitroethyl ether.

Example 5

The process of Example 3 was repeated using 100 grams of dinitroethane and 200 grams of isopropyl alcohol, the dinitroethane being added to the boiling alcohol over a period of 3 hours, and the mixture refluxed for a further 1 hour. 30.9 grams of isopropyl β-nitroethyl ether were obtained.

Example 6

The process of Example 4 was repeated using 200 grams n-butanol and 100 grams dinitroethane. The dinitroethane was added over a period of 3 hours, and the reaction mixture was then refluxed for a further 3 hours. 33.2 grams of n-butyl β-nitroethyl ether were obtained.

Example 7

The process of Example 4 was repeated with 250 grams of n-amyl alcohol and 100 grams of dinitroethane. The dinitroethane was added over a period of 3½ hours and the reaction mixture was refluxed for a further 4 hours. Most of the excess amyl alcohol was removed from the reaction mixture by means of a water pump and the further alcohol removed at a temperature of 40° C.–60° C., under a pressure of 1 mm. The residue was distilled, the fraction boiling at 57° C.–60° C., under 0.5 mm. pressure consisting mainly of the n-amyl nitroethyl ether.

Example 8

400 grams of methanol were reacted with 200 grams of dinitroethane under the conditions described in Example 1. 89.6 grams of methyl nitroethyl ether were obtained.

We claim:
1. The process for the preparation of beta-nitroethyl ethers which comprises refluxing with an alcohol, a substance from the group consisting of 1:2 dinitro-ethane and beta-nitroethyl nitrate.
2. The process for the preparation of beta-nitroethyl methyl ether which comprises refluxing methyl alcohol with 1:2 dinitro ethane.
3. The process for the preparation of $\beta$-nitroethyl ethers which comprises heating with an alcohol, a substance from the group consisting of 1:2-dinitroethane and $\beta$-nitroethyl nitrate.
4. The process for the preparation of $\beta$-nitroethyl methyl ether which comprises heating methyl alcohol with 1:2-dinitroethane.
5. The process for the preparation of $\beta$-nitroethyl ethyl ether which comprises heating ethyl alcohol with 1:2-dinitroethane.
6. The process for the preparation of $\beta$-nitroethyl ethyl ether which comprises refluxing ethyl alcohol with $\beta$-nitroethyl nitrate.

ARTHUR ERNEST WILDER SMITH.
ROBERT HOLROYD STANLEY.
CHARLES WILLIAM SCAIFE.

REFERENCES CITED

The following references are of record in the file of this patent:

UNITED STATES PATENTS

| Number | Name | Date |
| --- | --- | --- |
| 2,257,980 | Schwarz | Oct. 7, 1941 |
| 2,227,128 | Ellis | Dec. 31, 1940 |

OTHER REFERENCES

Beilstein, "Handbuch der Org. Chem.," 4th ed., vol. I, page 339, and vol. VI Supplement, pages 81 and 82.